United States Patent
Uneme

(10) Patent No.: US 10,476,396 B2
(45) Date of Patent: Nov. 12, 2019

(54) ELECTRIC POWER CONVERSION DEVICE

(71) Applicant: HONDA MOTOR CO., LTD., Minato-ku, Tokyo (JP)

(72) Inventor: Takahiro Uneme, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/358,803

(22) Filed: Mar. 20, 2019

(65) Prior Publication Data

US 2019/0305687 A1 Oct. 3, 2019

(30) Foreign Application Priority Data

Mar. 30, 2018 (JP) ................................. 2018-066825

(51) Int. Cl.
| | |
|---|---|
| *H02K 11/33* | (2016.01) |
| *H02M 3/335* | (2006.01) |
| *H01G 4/005* | (2006.01) |
| *H02M 7/48* | (2007.01) |

(52) U.S. Cl.
CPC ........ *H02M 3/33507* (2013.01); *H01G 4/005* (2013.01); *H02M 7/48* (2013.01)

(58) Field of Classification Search
CPC .. H02M 3/33507; H02M 3/325; H02M 3/335; H02M 7/42; H02M 7/44; H02M 7/48; H02M 2007/4803; H02K 11/33; H02K 1/04; H02P 3/00; H01L 27/12
See application file for complete search history.

(56) References Cited

U.S. PATENT DOCUMENTS

| | | | |
|---|---|---|---|
| 2008/0186751 A1* | 8/2008 | Tokuyama ............ | H01L 23/473 363/131 |
| 2011/0051371 A1* | 3/2011 | Azuma .................. | B60K 6/445 361/699 |

(Continued)

FOREIGN PATENT DOCUMENTS

| | | |
|---|---|---|
| JP | 2008-092695 | 4/2008 |
| JP | 2012-235081 | 11/2012 |

(Continued)

OTHER PUBLICATIONS

Japanese Office Action for Japanese Patent Application No. 2018-066825 dated Jun. 11, 2019.

*Primary Examiner* — Adolf D Berhane
(74) *Attorney, Agent, or Firm* — Amin, Turocy & Watson LLP

(57) ABSTRACT

An electric power conversion device includes an element-side first electrode conductor and an element-side second electrode conductor extending from a semiconductor element section toward one side in a first direction, and a capacitor-side first electrode conductor and a capacitor-side second electrode conductor extending from the capacitors toward the other side in the first direction, wherein a connecting surface of the element-side first electrode conductor and a connecting surface of the capacitor-side first electrode conductor overlap with each other and are electrically connected to each other, and a connecting surface of the element-side second electrode conductor and a connecting surface of the capacitor-side second electrode conductor overlap with each other and are electrically connected to each other.

4 Claims, 6 Drawing Sheets

(56) References Cited

U.S. PATENT DOCUMENTS

| | | | |
|---|---|---|---|
| 2013/0144477 A1* | 6/2013 | Yamada | B60L 3/003 |
| | | | 701/22 |
| 2016/0288661 A1* | 10/2016 | Kumazawa | B60L 7/14 |
| 2016/0318404 A1* | 11/2016 | Kumazawa | B60L 50/50 |
| 2017/0264229 A1* | 9/2017 | Murata | B60L 50/51 |
| 2019/0052211 A1* | 2/2019 | Nakai | H02P 21/22 |
| 2019/0122958 A1* | 4/2019 | Uneme | H01L 23/473 |
| 2019/0123622 A1* | 4/2019 | Uneme | H02K 11/25 |
| 2019/0131887 A1* | 5/2019 | Mori | H02P 21/22 |

FOREIGN PATENT DOCUMENTS

| | | |
|---|---|---|
| JP | 2015-084609 | 4/2015 |
| JP | 2017-093005 | 5/2017 |
| JP | 2017-188998 | 10/2017 |

\* cited by examiner

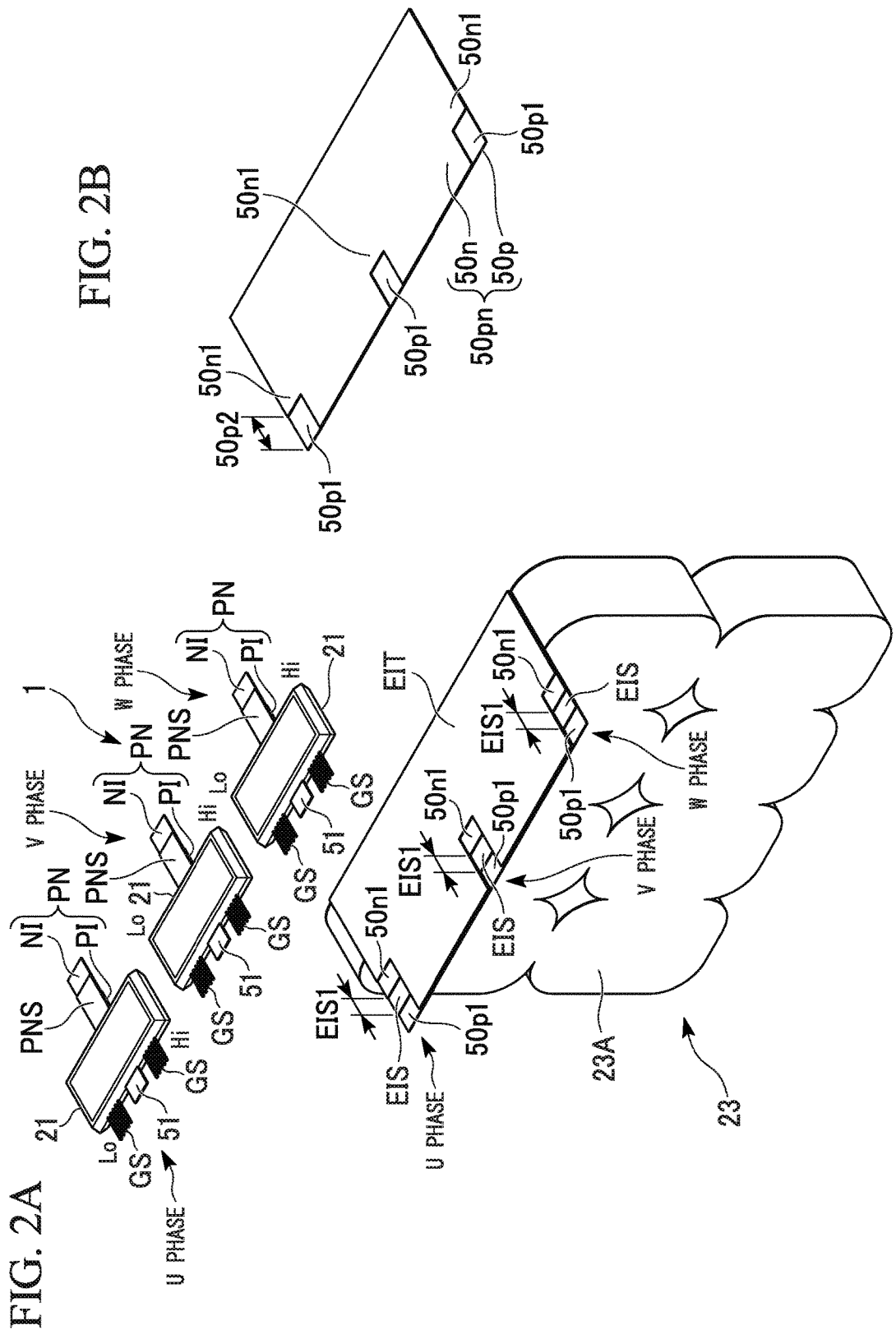

ELECTRIC POWER CONVERSION DEVICE

CROSS-REFERENCE TO RELATED APPLICATION

Priority is claimed on Japanese Patent Application No. 2018-066825, filed Mar. 30, 2018, the content of which is incorporated herein by reference.

BACKGROUND OF THE INVENTION

Field of the Invention

The present invention relates to an electric power conversion device.

Description of Related Art

In the related art, a semiconductor device that does not require a process of vertically inverting semiconductor elements when the semiconductor elements are disposed is known (for example, see Japanese Unexamined Patent Application, First Publication No. 2012-235081). In the semiconductor device disclosed in Japanese Unexamined Patent Application, First Publication No. 2012-235081, a first semiconductor element (an upper arm element) and a second semiconductor element (a lower arm element) are disposed parallel to each other. In addition, when a thin plate section of a conductor electrically connected to an electrode of the first semiconductor element on an upper surface side is fixed to a thin plate section of a conductor electrically connected to an electrode of the second semiconductor element on a lower surface side, the electrode of the first semiconductor element on the upper surface side and the electrode of the second semiconductor element on the lower surface side are electrically connected to each other.

SUMMARY OF THE INVENTION

Incidentally, Japanese Unexamined Patent Application, First Publication No. 2012-235081 does not disclose to what the conductor electrically connected to the electrode of the first semiconductor element on the lower surface side and the conductor electrically connected to the electrode of the second semiconductor element on the upper surface side are electrically connected. Supposing that the conductor electrically connected to the electrode of the first semiconductor element on the lower surface side and the conductor electrically connected to the electrode of the second semiconductor element on the upper surface side are electrically connected to the capacitor, according to a method of connecting these conductors and the capacitor, there is a concern such that a floating inductance in the connecting portion between these conductors and the capacitor are increased.

An aspect of the present invention is directed to providing an electric power conversion device that is capable to suppress an increase in a floating inductance of an electrical connecting portion between a semiconductor element section and a capacitor.

(1) An electric power conversion device according to an aspect of the present invention includes a semiconductor element section having an upper arm element and a lower arm element; a capacitor; an element-side first electrode conductor electrically connected to one of the upper arm element and the lower arm element and extending toward one side in a first direction; an element-side second electrode conductor electrically connected to the other one of the upper arm element and the lower arm element and extending toward the one side in the first direction; a capacitor-side first electrode conductor electrically connected to the capacitor and extending toward other side in the first direction; and a capacitor-side second electrode conductor electrically connected to the capacitor and extending toward the other side in the first direction, wherein the element-side first electrode conductor and the element-side second electrode conductor face each other and constitute an element-side conductor set, the capacitor-side first electrode conductor and the capacitor-side second electrode conductor face each other and constitute a capacitor-side conductor set, the element-side first electrode conductor includes an element-side first connecting surface that overlaps with the capacitor-side first electrode conductor, the element-side second electrode conductor includes an element-side protrusion protruding further toward the one side in the first direction than the element-side first electrode conductor, the element-side protrusion includes an element-side second connecting surface that overlaps with the capacitor-side second electrode conductor, the capacitor-side first electrode conductor includes a capacitor-side protrusion protruding further toward the other side in the first direction than the capacitor-side second electrode conductor, the capacitor-side protrusion includes a capacitor-side first connecting surface that overlaps with the element-side first connecting surface, the capacitor-side second electrode conductor includes a capacitor-side second connecting surface that overlaps with the element-side second connecting surface, the element-side first connecting surface and the capacitor-side first connecting surface extend parallel to each other and are electrically connected to each other the element-side first connecting surface and the capacitor-side first connecting surface overlap with each other, and the element-side second connecting surface and the capacitor-side second connecting surface extend parallel to each other and are electrically connected to each other since the element-side second connecting surface and the capacitor-side second connecting surface overlap with each other.

(2) In the electric power conversion device according to the aspect (1), a plurality of element-side conductor sets may be provided, and a width of the element-side first connecting surface and the element-side second connecting surface of each of the element-side conductor sets in a second direction perpendicular to the first direction may be smaller than a width of the capacitor-side conductor set in the second direction.

(3) The electric power conversion device according to the aspect (1) or (2) may include an element-side electrically insulating section configured to electrically insulate the element-side first electrode conductor from the element-side second electrode conductor; and a capacitor-side electrically insulating section configured to electrically insulate the capacitor-side first electrode conductor from the capacitor-side second electrode conductor, wherein the element-side electrically insulating section may include an element-side protruding electrically insulating section protruding further toward the one side in the first direction than the element-side first electrode conductor, and the capacitor-side electrically insulating section may include a capacitor-side protruding electrically insulating section protruding further toward the other side in the first direction than the capacitor-side second electrode conductor.

(4) In the electric power conversion device according to the aspect (3), the element-side second electrode conductor may protrude toward the one side in the first direction further than the element-side protruding electrically insulating section, a portion of the element-side protrusion protruding further toward the one side in the first direction than the element-side protruding electrically insulating section may include the element-side second connecting surface, the capacitor-side first electrode conductor may protrude toward the other side in the first direction further than the capacitor-side protruding electrically insulating section, and a portion of the capacitor-side protrusion protruding further toward the other side in the first direction than the capacitor-side protruding electrically insulating section may include the capacitor-side first connecting surface.

In the electric power conversion device according to the aspect (1), since the element-side first connecting surface and the capacitor-side first connecting surface parallel to each other overlap with each other, since the element-side first electrode conductor and the capacitor-side first electrode conductor are electrically connected to each other, and since the element-side second connecting surface and the capacitor-side second connecting surface parallel to each other overlap with each other, the element-side second electrode conductor and the capacitor-side second electrode conductor are electrically connected to each other.

For this reason, in the electric power conversion device according to the aspect (1), increase in a floating inductance of an electrical connecting portion between the element-side first electrode conductor and the capacitor-side first electrode conductor and an electrical connecting portion between the element-side second electrode conductor and the capacitor-side second electrode conductor can be minimized. That is, increase in a floating inductance of an electrical connecting portion between the semiconductor element section and the capacitor can be minimized.

In the electric power conversion device according to the aspect (2), the width of the element-side first connecting surface and the element-side second connecting surface of each of the plurality of element-side conductor sets in the second direction perpendicular to the first direction may be smaller than the width of the capacitor-side conductor set in the second direction.

In the case of the above-mentioned configuration, in comparison with the case in which the width of the element-side first connecting surface and the element-side second connecting surface in the second direction is equal to the width of the capacitor-side conductor set in the second direction, work of bonding the element-side conductor set to the capacitor-side conductor set can be facilitated.

In the electric power conversion device according to the aspect (3), the element-side first electrode conductor and the element-side second electrode conductor are electrically insulated by the element-side electrically insulating section including the element-side protruding electrically insulating section protruding further toward the one side in the first direction than the element-side first electrode conductor, and the capacitor-side first electrode conductor and the capacitor-side second electrode conductor are electrically insulated by the capacitor-side electrically insulating section including the capacitor-side protruding electrically insulating section protruding further toward the other side in the first direction than the capacitor-side second electrode conductor.

In the case of the above-mentioned configuration, an electrically insulating property between the capacitor-side first electrode conductor and the capacitor-side second electrode conductor can be secured by the capacitor-side protruding electrically insulating section and an electrically insulating property between the element-side first electrode conductor and the element-side second electrode conductor using the element-side protruding electrically insulating section can be secured while suppressing increase in a floating inductance of the electrical connecting portion between the element-side first electrode conductor and the capacitor-side first electrode conductor and the electrical connecting portion between the element-side second electrode conductor and the capacitor-side second electrode conductor.

In the electric power conversion device according to the aspect (4), the portion of the element-side protrusion protruding further toward the one side in the first direction than the element-side protruding electrically insulating section may include the element-side second connecting surface that overlaps with the capacitor-side second connecting surface, and the portion of the capacitor-side protrusion protruding further toward the other side in the first direction than the capacitor-side protruding electrically insulating section may include the capacitor-side first connecting surface that overlaps with the element-side first connecting surface.

In the case of the above-mentioned configuration, an electrically insulating property between the capacitor-side first electrode conductor and the element-side second electrode conductor can be secured by the capacitor-side protruding electrically insulating section and an electrically insulating property between the element-side first electrode conductor and the capacitor-side second electrode conductor using the element-side protruding electrically insulating section can be secured while suppressing increase in a floating inductance of the electrical connecting portion between the element-side first electrode conductor and the capacitor-side first electrode conductor and the electrical connecting portion between the element-side second electrode conductor and the capacitor-side second electrode conductor.

BRIEF DESCRIPTION OF THE DRAWINGS

FIG. 2A is a perspective view of an example of the electric power conversion device of the first embodiment.

FIG. 2B is a perspective view of the example of the electric power conversion device of the first embodiment.

DETAILED DESCRIPTION OF THE INVENTION

Hereinafter, embodiments of an electric power conversion device of the present invention will be described with reference to the accompanying drawings.

First Embodiment

Figure 1A:
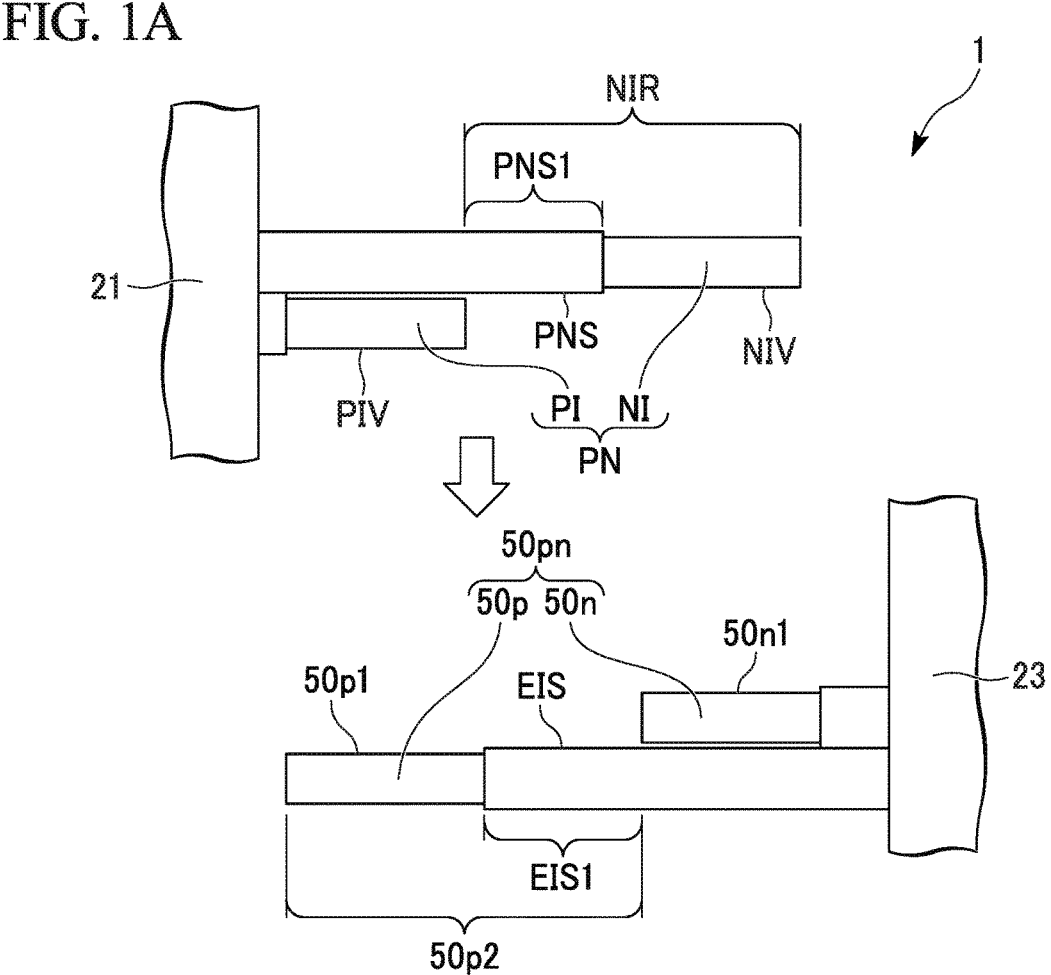
FIG. 1A is a view showing an example of a schematic configuration of an electric power conversion device of a first embodiment.
Figure 1B:
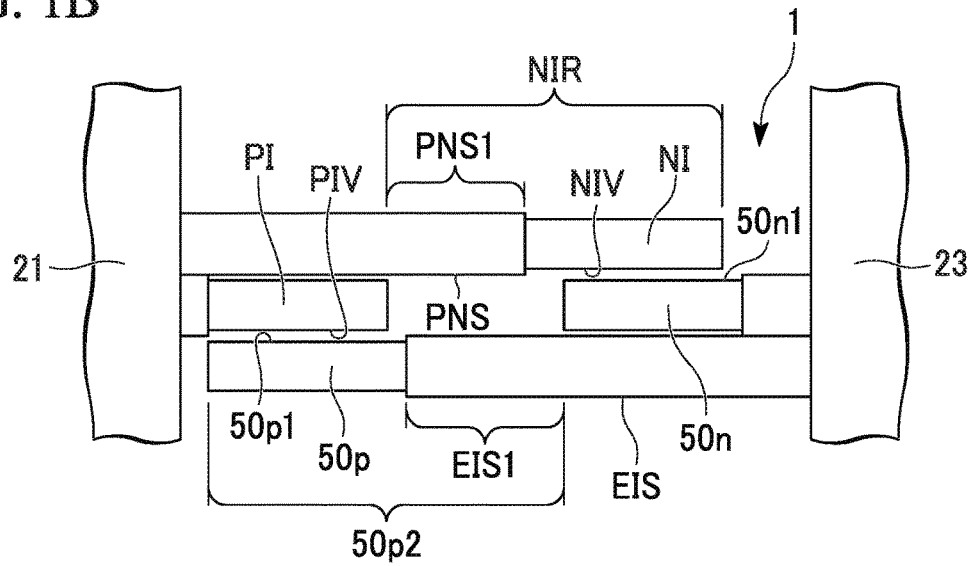
FIG. 1B is a view showing an example of a schematic configuration of the electric power conversion device of the first embodiment.

FIG. 1A and FIG. 1B are views showing an example of a schematic configuration of an electric power conversion device 1 of a first embodiment. Specifically, FIG. 1A is a schematic front view of the electric power conversion device 1 in a state before a power module (a semiconductor element section) 21 is electrically connected to a capacitor unit 23. FIG. 1B is a schematic front view of the electric power conversion device 1 in a state after the power module 21 is electrically connected to the capacitor unit 23.

Figure 3:
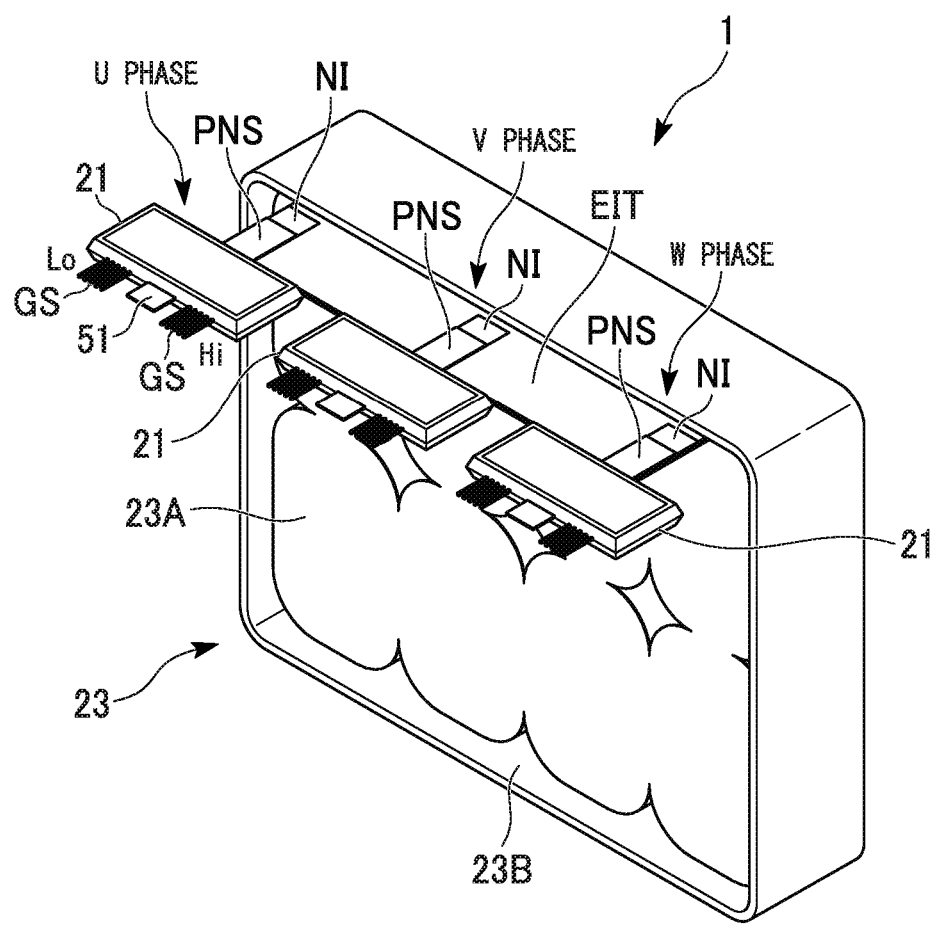
FIG. 3 is a perspective view of an example of the electric power conversion device of the first embodiment.

FIG. 2A, FIG. 2B and FIG. 3 are perspective views of an example of the electric power conversion device 1 of the first embodiment. Specifically, FIG. 2A is a perspective view of the electric power conversion device 1 corresponding to a state shown in FIG. 1A when a capacitor case 23B and a potting material are seen in a see-through view. FIG. 2B is a view extracting and showing a conductor set 50pn in FIG. 2A. Specifically, FIG. 2B is a perspective view of the conductor set 50pn when electrically insulating sections EIT and EIS in FIG. 2A are seen in a see-through view. FIG. 3 is a perspective view of the electric power conversion device 1 corresponding to the state shown in FIG. 1B.

In the example shown in FIG. 1A to FIG. 3, the electric power conversion device 1 includes the power module (the semiconductor element section) 21, the capacitor unit 23, a positive electrode-side conductor PI serving as one of an element-side first electrode conductor and an element-side second electrode conductor, a negative electrode-side conductor NI serving as the another one of the element-side first electrode conductor and the element-side second electrode conductor, a positive electrode terminal 50p serving as one of a capacitor-side first electrode conductor and a capacitor-side second electrode conductor, and a negative electrode terminal 50n serving as the another one of the capacitor-side first electrode conductor and the capacitor-side second electrode conductor.

Specifically, as shown in FIG. 2A and FIG. 3, the electric power conversion device 1 includes the power module 21 of a U phase, the power module 21 of a V phase, and the power module 21 of a W phase. The power module 21 of the U phase has an upper arm element UH (see FIG. 6) and a lower arm element UL (see FIG. 6). The power module 21 of the V phase has an upper arm element VH (see FIG. 6) and a lower arm element VL (see FIG. 6). The power module 21 of the W phase has an upper arm element WH (see FIG. 6) and a lower arm element WL (see FIG. 6).

In another example, the electric power conversion device 1 may include the power module 21 having an upper arm element and a lower arm element for only one phase.

In the example shown in FIG. 1A to FIG. 3, the electric power conversion device 1 includes the positive electrode-side conductor PI of a U phase, the negative electrode-side conductor NI of a U phase, an output-side conductor 51 of a U phase, the positive electrode-side conductor PI of a V phase, the negative electrode-side conductor NI of a V phase, the output-side conductor 51 of a V phase, the positive electrode-side conductor PI of a W phase, the negative electrode-side conductor NI of a W phase, the output-side conductor 51 of a W phase, and a gate signal line GS.

The positive electrode-side conductor PI of the U phase is electrically connected to the upper arm element UH of the U phase and extends toward one side in a first direction (rightward in a leftward/rightward direction in FIG. 1A and FIG. 1B, a right upper side in a leftward/downward-rightward/upward direction in FIG. 2A and FIG. 3). The negative electrode-side conductor NI of the U phase is electrically connected to the lower arm element UL of the U phase and extends toward one side in the first direction. The positive electrode-side conductor PI and the negative electrode-side conductor NI of the U phase facing each other constitute a conductor set PN of a U phase on a module side. The output-side conductor 51 of the U phase is electrically connected to the upper arm element UH and the lower arm element UL of the U phase and extends toward the other side in the first direction (a left lower side in a leftward/downward-rightward/upward direction in FIG. 2A and FIG. 3). A gate signal is input to the upper arm element UH and the lower arm element UL of the U phase via the gate signal line GS.

The positive electrode-side conductor PI of the V phase is electrically connected to the upper arm element VH of the V phase and extends toward the one side in the first direction (a right side in the leftward/rightward direction in FIG. 1A and FIG. 1B, a right upper side in a leftward/downward-rightward/upward direction in FIG. 2A and FIG. 3). The negative electrode-side conductor NI of the V phase is electrically connected to the lower arm element VL of the V phase and extends toward the one side in the first direction. The positive electrode-side conductor PI and the negative electrode-side conductor NI of the V phase facing each other constitute the conductor set PN of the V phase on the module side. The output-side conductor 51 of the V phase is electrically connected to the upper arm element VH and the lower arm element VL of the V phase and extends toward the other side in the first direction (toward a left lower side in the leftward/downward-rightward/upward direction in FIG. 2A and FIG. 3). A gate signal is input to the upper arm element VH and the lower arm element VL of the V phase via the gate signal line GS.

The positive electrode-side conductor PI of the W phase is electrically connected to the upper arm element WH of the W phase and extends toward the one side in the first direction (a right side in the leftward/rightward direction in FIG. 1A and FIG. 1B, a right upper side in the leftward/downward-rightward/upward direction in FIG. 2A and FIG. 3). The negative electrode-side conductor NI of the W phase is electrically connected to the lower arm element WL of the W phase and extends toward the one side in the first direction. The positive electrode-side conductor PI and the negative electrode-side conductor NI of the W phase facing each other constitute the conductor set PN of the W phase on the module side. The output-side conductor 51 of the W phase is electrically connected to the upper arm element WH and the lower arm element WL of the W phase and extends toward the other side in the first direction (a left lower side in the leftward/downward-rightward/upward direction in FIG. 2A and FIG. 3). A gate signal is input to the upper arm element WH and the lower arm element WL of the W phase via the gate signal line GS.

In another example, the electric power conversion device 1 may include the positive electrode-side conductor PI, the negative electrode-side conductor NI, the output-side conductor 51 and the gate signal line GS for only one phase.

In the example shown in FIG. 1A to FIG. 3, the capacitor unit 23 includes a capacitor element 23A (see FIG. 2A and FIG. 3) and the capacitor case 23B (see FIG. 3).

The positive electrode terminal 50p is electrically connected to the capacitor unit 23 and extends toward the other side in the first direction (a left side in the leftward/rightward direction in FIG. 1A and FIG. 1B, a left lower side in the leftward/downward-rightward/upward direction in FIG. 2A, FIG. 2B and FIG. 3). The negative electrode terminal 50n is electrically connected to the capacitor unit 23 and extends toward the other side in the first direction. The positive electrode terminal 50p and the negative electrode terminal 50n facing each other constitute the conductor set 50pn on the capacitor side.

In the example shown in FIG. 1A to FIG. 3, the positive electrode-side conductor PI of the U phase includes a connecting surface PIV (see FIG. 1A and FIG. 1B) that overlaps the positive electrode terminal 50p. Similarly, the positive electrode-side conductor PI of the V phase includes the connecting surface PIV that overlaps the positive electrode terminal 50p. In addition, the positive electrode-side conductor PI of the W phase includes the connecting surface PIV that overlaps the positive electrode terminal 50p.

In another example, the positive electrode-side conductor PI of one phase may include the connecting surface PIV of one phase that overlaps with the positive electrode terminal 50p.

In the example shown in FIG. 1A to FIG. 3, the negative electrode-side conductor NI of the U phase includes a protrusion NIR (see FIG. 1A and FIG. 1B) protruding further toward the one side in the first direction (a right side in the leftward/rightward direction in FIG. 1A and FIG. 1B, a right upper side in leftward/downward-rightward/upward direction in FIG. 2A and FIG. 3) than the positive electrode-side conductor PI of the U phase. The protrusion NIR of the negative electrode-side conductor NI of the U phase includes a connecting surface NIV (see FIG. 1A and FIG. 1B) that overlaps with the negative electrode terminal 50n.

Similarly, the negative electrode-side conductor NI of the V phase includes the protrusion NIR protruding further toward the one side in the first direction than the positive electrode-side conductor PI of the V phase. The protrusion NIR of the negative electrode-side conductor NI of the V phase includes the connecting surface NIV that overlaps with the negative electrode terminal 50n.

In addition, the negative electrode-side conductor NI of the W phase includes the protrusion NIR protruding further toward the one side in the first direction than the positive electrode-side conductor PI of the W phase. The protrusion NIR of the negative electrode-side conductor NI of the W phase includes the connecting surface NIV that overlaps the negative electrode terminal 50n.

In another example, the negative electrode-side conductor NI of one phase may include the protrusion NIR of one phase protruding further toward the one side in the first direction than the positive electrode-side conductor PI, and the protrusion NIR of one phase may include the connecting surface NIV of one phase that overlaps with the negative electrode terminal 50n.

In the example shown in FIG. 1A to FIG. 3, the positive electrode terminal 50p includes a protrusion 50p2 protruding further toward the other side in the first direction (a left side in the leftward/rightward direction in FIG. 1A and FIG. 1B, a left lower side in the leftward/downward-rightward/upward direction in FIG. 2A and FIG. 3) than the negative electrode terminal 50n. The protrusion 50p2 includes a connecting surface 50p1 (see FIG. 1A, FIG. 1B, FIG. 2A and FIG. 2B) that overlaps the connecting surface PIV (see FIG. 1A and FIG. 1B).

Specifically, the positive electrode terminal 50p includes the connecting surface 50p1 (see FIG. 2A and FIG. 2B) of the U phase that overlaps with the connecting surface PIV of the positive electrode-side conductor PI of the U phase, the connecting surface 50p1 (see FIG. 2A and FIG. 2B) of the V phase that overlaps with the connecting surface PIV of the positive electrode-side conductor PI of the V phase, and the connecting surface 50p1 (see FIG. 2A and FIG. 2B) of the W phase that overlaps with the connecting surface PIV of the positive electrode-side conductor PI of the W phase.

In another example, the positive electrode terminal 50p may include the connecting surface 50p1 for only one phase that overlaps with the connecting surface PIV of the positive electrode-side conductor PI of one phase.

In the example shown in FIG. 1A to FIG. 3, the negative electrode terminal 50n includes a connecting surface 50n1 that overlaps the connecting surface NIV (see FIG. 1A and FIG. 1B).

Specifically, the negative electrode terminal 50n includes the connecting surface 50n1 (see FIG. 2A and FIG. 2B) of the U phase that overlaps the connecting surface NIV of the negative electrode-side conductor NI of the U phase, the connecting surface 50n1 (see FIG. 2A and FIG. 2B) of the V phase that overlaps the connecting surface NIV of the negative electrode-side conductor NI of the V phase, and the connecting surface 50n1 (see FIG. 2A and FIG. 2B) of the W phase that overlaps the connecting surface NIV of the negative electrode-side conductor NI of the W phase.

In another example, the negative electrode terminal 50n may include the connecting surface 50n1 for only one phase that overlaps with the connecting surface NIV of the negative electrode-side conductor NI of one phase.

In the example shown in FIG. 1A to FIG. 3, the connecting surface PIV of the positive electrode-side conductor PI and the connecting surface 50p1 of the positive electrode terminal 50p extends parallel to each other. In addition, when the connecting surface PIV of the positive electrode-side conductor PI and the connecting surface 50p1 of the positive electrode terminal 50p overlap each other, the positive electrode-side conductor PI and the positive electrode terminal 50p are electrically connected to each other. Electrical connection between the positive electrode-side conductor PI and the positive electrode terminal 50p is performed through, for example, welding, brazing, or the like.

Specifically, the connecting surface PIV of the positive electrode-side conductor PI of the U phase and the connecting surface 50p1 of the U phase of the positive electrode terminal 50p extend parallel to each other, the connecting surface PIV of the positive electrode-side conductor PI of the V phase and the connecting surface 50p1 of the V phase of the positive electrode terminal 50p extend parallel to each other, and the connecting surface PIV of the positive electrode-side conductor PI of the W phase and the connecting surface 50p1 of the W phase of the positive electrode terminal 50p extend parallel to each other.

Since the connecting surface PIV of the positive electrode-side conductor PI of the U phase overlaps the connecting surface 50p1 of the U phase of the positive electrode terminal 50p, the positive electrode-side conductor PI and the positive electrode terminal 50p of the U phase are electrically connected to each other, since the connecting surface PIV of the positive electrode-side conductor PI of the V phase overlaps the connecting surface 50p1 of the V phase of the positive electrode terminal 50p, the positive electrode-side conductor PI and the positive electrode terminal 50p of the V phase are electrically connected to each other, and since the connecting surface PIV of the positive electrode-side conductor PI of the W phase overlaps the connecting surface 50p1 of the W phase of the positive electrode terminal 50p, the positive electrode-side conductor PI and the positive electrode terminal 50p of the W phase are electrically connected to each other.

In another example, since the connecting surface PIV of the positive electrode-side conductor PI of one phase and the connecting surface 50p1 of one phase extent of the positive electrode terminal 50p extend parallel to each other and the connecting surface PIV of the positive electrode-side conductor PI of one phase overlaps the connecting surface 50p1 of one phase of the positive electrode terminal 50p, the positive electrode-side conductor PI and the positive electrode terminal 50p of one phase may be electrically connected to each other.

In the example shown in FIG. 1A to FIG. 3, the connecting surface NIV of the negative electrode-side conductor NI and the connecting surface 50n1 of the negative electrode terminal 50n extend parallel to each other. In addition, since the connecting surface NIV of the negative electrode-side conductor NI and the connecting surface 50n1 of the negative electrode terminal 50n overlap each other, the negative electrode-side conductor NI and the negative electrode terminal 50n are electrically connected to each other. Electrical connection between the negative electrode-side conductor NI and the negative electrode terminal 50n is performed through, for example, welding, brazing, or the like.

Specifically, the connecting surface NIV of the negative electrode-side conductor NI of the U phase and the connecting surface 50n1 of the U phase of the negative electrode terminal 50n extend parallel to each other, the connecting surface NIV of the negative electrode-side conductor NI of the V phase and the connecting surface 50n1 of the V phase of the negative electrode terminal 50n extend parallel to each other, and the connecting surface NIV of the negative electrode-side conductor NI of the W phase and the connecting surface 50n1 of the W phase of the negative electrode terminal 50n extend parallel to each other.

Since the connecting surface NIV of the negative electrode-side conductor NI of the U phase overlaps the connecting surface 50n1 of the U phase of the negative electrode terminal 50n, the negative electrode-side conductor NI and the negative electrode terminal 50n of the U phase are electrically connected to each other, since the connecting surface NIV of the negative electrode-side conductor NI of the V phase overlaps the connecting surface 50n1 of the V phase of the negative electrode terminal 50n, the negative electrode-side conductor NI and the negative electrode terminal 50n of the V phase are electrically connected to each other, and since the connecting surface NIV of the negative electrode-side conductor NI of the W phase overlaps the connecting surface 50n1 of the W phase of the negative electrode terminal 50n, the negative electrode-side conductor NI and the negative electrode terminal 50n of the W phase are electrically connected to each other.

In another example, when the connecting surface NIV of the negative electrode-side conductor NI of one phase and the connecting surface 50n1 of one phase of the negative electrode terminal 50n extend parallel to each other and the connecting surface NIV of the negative electrode-side conductor NI of one phase overlaps the connecting surface 50n1 of one phase of the negative electrode terminal 50n, the negative electrode-side conductor NI and the negative electrode terminal 50n of one phase may be electrically connected to each other.

In the example shown in FIG. 1A to FIG. 3, the electric power conversion device 1 includes an electrically insulating section PNS such as a laminate (an electrically insulating resin, an electrically insulating paper, or the like) or the like configured to electrically insulate the positive electrode-side conductor PI from the negative electrode-side conductor NI. The electrically insulating section PNS includes a protruding electrically insulating section PNS1 protruding further toward the one side in the first direction (a right side in the leftward/rightward direction in FIG. 1A and FIG. 1B, a right upper side in the leftward/downward-rightward/upward direction in FIG. 2A and FIG. 3) than the positive electrode-side conductor PI.

Specifically, the electric power conversion device 1 includes the electrically insulating section PNS of the U phase configured to electrically insulate the positive electrode-side conductor PI from the negative electrode-side conductor NI of the U phase, the electrically insulating section PNS of the V phase configured to electrically insulate the positive electrode-side conductor PI from the negative electrode-side conductor NI of the V phase, and the electrically insulating section PNS of the W phase configured to electrically insulate the positive electrode-side conductor PI from the negative electrode-side conductor NI of the W phase. The electrically insulating section PNS of the U phase includes the protruding electrically insulating section PNS1 (see FIG. 1A and FIG. 1B) of the U phase protruding further toward the one side in the first direction (a right side in the leftward/rightward direction in FIG. 1A and FIG. 1B) than the positive electrode-side conductor PI of the U phase. Similarly, the electrically insulating section PNS of the V phase includes the protruding electrically insulating section PNS1 of the V phase protruding further toward the one side in the first direction (a right upper side in the leftward/downward-rightward/upward direction in FIG. 2A and FIG. 3) than the positive electrode-side conductor PI of the V phase. The electrically insulating section PNS of the W phase includes the protruding electrically insulating section PNS1 of the W phase protruding further toward the one side in the first direction than the positive electrode-side conductor PI of the W phase.

In another example, the electric power conversion device 1 may include the electrically insulating section PNS of one phase configured to electrically insulate the positive electrode-side conductor PI from the negative electrode-side conductor NI of one phase, and the electrically insulating section PNS of one phase may include the protruding electrically insulating section PNS1 of one phase protruding further toward the one side in the first direction than the positive electrode-side conductor PI.

In the example shown in FIG. 1A to FIG. 3, a part of the protrusion NIR of the negative electrode-side conductor NI protrudes further toward the one side in the first direction (a right side in the leftward/rightward direction in FIG. 1A and FIG. 1B, a right upper side in the leftward/downward-rightward/upward direction in FIG. 2A and FIG. 3) than the protruding electrically insulating section PNS1. The part includes the connecting surface NIV. That is, the connecting surface PIV of the positive electrode-side conductor PI and the connecting surface NIV of the negative electrode-side conductor NI are separated in the first direction (in the leftward/rightward direction in FIG. 1A and FIG. 1B, in the leftward/downward-rightward/upward direction in FIG. 2A and FIG. 3) to an extent of the protruding electrically insulating section PNS1 and electrically insulated by the protruding electrically insulating section PNS1.

Specifically, a part of the protrusion NIR of the negative electrode-side conductor NI of the U phase protrudes further toward the one side in the first direction (a right side in the leftward/rightward direction in FIG. 1A and FIG. 1B, a right upper side in the leftward/downward-rightward/upward direction in FIG. 2A and FIG. 3) than the protruding electrically insulating section PNS1 of the U phase. The part of the U phase includes the connecting surface NIV that overlaps the connecting surface 50n1 of the U phase of the negative electrode terminal 50n. The connecting surface PIV of the positive electrode-side conductor PI and the connecting surface NIV of the negative electrode-side conductor NI of the U phase are separated in the first direction (in the leftward/rightward direction in FIG. 1A and FIG. 1B, in the leftward/downward-rightward/upward direction in FIG. 2A and FIG. 3) to an extent of the protruding electrically insulating section PNS1 of the U phase, and electrically insulated by the protruding electrically insulating section PNS1 of the U phase.

A part of the protrusion NIR of the negative electrode-side conductor NI of the V phase protrudes further toward the one side in the first direction (a right upper side in the leftward/downward-rightward/upward direction in FIG. 2A and FIG. 3) than the protruding electrically insulating section PNS1 of the V phase. The part of the V phase includes the connecting surface NIV that overlaps the connecting surface 50n1 of the V phase of the negative electrode terminal 50n. The connecting surface PIV of the positive electrode-side conductor PI and the connecting surface NIV of the negative electrode-side conductor NI of the V phase are separated in the first direction (in the leftward/downward-rightward/upward direction in FIG. 2A and FIG. 3) to an extent of the protruding electrically insulating section PNS1 of the V phase and electrically insulated by the protruding electrically insulating section PNS1 of the V phase.

A part of the protrusion NIR of the negative electrode-side conductor NI of the W phase protrudes toward the one side in the first direction further than the protruding electrically insulating section PNS1 of the W phase. The part of the W phase includes the connecting surface NIV that overlaps the connecting surface 50n1 of the W phase of the negative electrode terminal 50n. The connecting surface PIV of the positive electrode-side conductor PI and the connecting surface NIV of the negative electrode-side conductor NI of the W phase are separated in the first direction to an extent of the protruding electrically insulating section PNS1 of the W phase and electrically insulated by the protruding electrically insulating section PNS1 of the W phase.

In another example, a part of the protrusion NIR of the negative electrode-side conductor NI of one phase may protrude toward one side in the first direction further than the protruding electrically insulating section PNS1 of one phase, the part of the one phase may include the connecting surface NIV that overlaps the connecting surface 50n1 of one phase of the negative electrode terminal 50n, and the connecting surface PIV of the positive electrode-side conductor PI and the connecting surface NIV of the negative electrode-side conductor NI of one phase may be separated in the first direction to an extent of the protruding electrically insulating section PNS1 of one phase and electrically insulated by the protruding electrically insulating section PNS1 of one phase.

In the example shown in FIG. 1A to FIG. 3, the electric power conversion device 1 includes the electrically insulating section EIS (see FIG. 1A, FIG. 1B and FIG. 2A) such as a laminate (an electrical insulating resin, an electrical insulating paper, or the like) or the like configured to electrically insulate the positive electrode terminal 50p from the negative electrode terminal 50n. The electrically insulating section EIS includes a protruding electrically insulating section EIS1 (see FIG. 1A, FIG. 1B and FIG. 2A) protruding further toward the other side in the first direction (a left side in the leftward/rightward direction in FIG. 1A and FIG. 1B, and a left lower side in the leftward/downward-rightward/upward direction in FIG. 2A and FIG. 3) than the negative electrode terminal 50n. In addition, the electric power conversion device 1 includes the electrically insulating section EIT (see FIG. 2A and FIG. 3) such as a laminate or the like configured to cover most of the negative electrode terminal 50n.

Specifically, the electrically insulating section EIS includes the protruding electrically insulating section EIS1 of the U phase protruding further toward the other side in the first direction (a left lower side in the leftward/downward-rightward/upward direction in FIG. 2A) than the connecting surface 50n1 of the U phase of the negative electrode terminal 50n, the protruding electrically insulating section EIS1 of the V phase protruding further toward the other side in the first direction than the connecting surface 50n1 of the V phase of the negative electrode terminal 50n, and the protruding electrically insulating section EIS1 of the W phase protruding further toward the other side in the first direction than the connecting surface 50n1 of the W phase of the negative electrode terminal 50n.

In another example, the electrically insulating section EIS may include the protruding electrically insulating section EIS1 of one phase protruding further toward the other side in the first direction than the connecting surface 50n1 of one phase of the negative electrode terminal 50n.

In the example shown in FIG. 1A to FIG. 3, a part of the protrusion 50p2 of the positive electrode terminal 50p protrudes further toward the other side in the first direction (a left side in the leftward/rightward direction in FIG. 1A and FIG. 1B, a left lower side in the leftward/downward-rightward/upward direction in FIG. 2A and FIG. 3) than the protruding electrically insulating section EIS1. The part includes the connecting surface 50p1. That is, the connecting surface 50p1 of the positive electrode terminal 50p and the connecting surface 50n1 of the negative electrode terminal 50n are separated in the first direction (in the leftward/rightward direction in FIG. 1A and FIG. 1B, in the leftward/downward-rightward/upward direction in FIG. 2A and FIG. 3) to an extent of the protruding electrically insulating section EIS1 and electrically insulated by the protruding electrically insulating section EIS1.

Specifically, a part of the protrusion 50p2 of the U phase of the positive electrode terminal 50p protrudes further toward the other side in the first direction (a left side in the leftward/rightward direction in FIG. 1A and FIG. 1B, a left lower side in the leftward/downward-rightward/upward direction in FIG. 2A and FIG. 3) than the protruding electrically insulating section EIS1 of the U phase. The part of the U phase of the positive electrode terminal 50p includes the connecting surface 50p1 that overlaps the connecting surface PIV of the positive electrode-side conductor PI of the U phase. The connecting surface 50p1 of the U phase of the positive electrode terminal 50p and the connecting surface 50n1 of the U phase of the negative electrode terminal 50n are separated in the first direction (in the leftward/rightward direction in FIG. 1A and FIG. 1B, in the leftward/downward-rightward/upward direction in FIG. 2A and FIG. 3) to an extent of the protruding electrically insulating section EIS1 of U phase and electrically insulated by the protruding electrically insulating section EIS1 of the U phase.

A part of the protrusion 50p2 of the V phase of the positive electrode terminal 50p protrudes further toward the other side in the first direction (a left lower side in the leftward/downward-rightward/upward direction in FIG. 2A and FIG. 3) than the protruding electrically insulating section EIS1 of the V phase. The part of the V phase of the positive electrode terminal 50p includes the connecting surface 50p1 that overlaps the connecting surface PIV of the positive electrode-side conductor PI of the V phase. The connecting surface 50p1 of the V phase of the positive electrode terminal 50p and the connecting surface 50n1 of the V phase of the negative electrode terminal 50n are separated in the first direction (in the leftward/downward-rightward/upward direction in FIG. 2A and FIG. 3) to an extent of the protruding electrically insulating section EIS1 of the V phase and electrically insulated by the protruding electrically insulating section EIS1 of the V phase.

A part of the protrusion 50p2 of the W phase of the positive electrode terminal 50p protrudes toward the other side in the first direction further than the protruding electrically insulating section EIS1 of the W phase. The part of the W phase of the positive electrode terminal 50p includes the connecting surface 50p1 that overlaps the connecting surface PIV of the positive electrode-side conductor PI of the W phase. The connecting surface 50p1 of the W phase of the positive electrode terminal 50p and the connecting surface 50n1 of the W phase of the negative electrode terminal 50n are separated in the first direction to an extent of the protruding electrically insulating section EIS1 of the W phase and electrically insulated by the protruding electrically insulating section EIS1 of the W phase.

In another example, a part of the protrusion 50p2 of one phase of the positive electrode terminal 50p protrudes toward the other side in the first direction further than the protruding electrically insulating section EIS1 of one phase, and the part of the one phase includes the connecting surface 50p1 that overlaps the connecting surface PIV of the positive electrode-side conductor PI of one phase, and the connecting surface 50p1 of one phase of the positive electrode terminal 50p and the connecting surface 50n1 of one phase of the negative electrode terminal 50n are separated in the first direction to an extent of the protruding electrically insulating section EIS1 of one phase and electrically insulated by the protruding electrically insulating section EIS1 of one phase.

In the electric power conversion device 1 of the first embodiment, as described above, since the connecting surface PIV and the connecting surface 50p1 parallel to each other overlap each other, the positive electrode-side conductor PI and the positive electrode terminal 50p are electrically connected to each other, and since the connecting surface NIV and the connecting surface 50n1 parallel to each other overlap each other, the negative electrode-side conductor NI and the negative electrode terminal 50n are electrically connected to each other.

For this reason, in the electric power conversion device 1 of the first embodiment, increase in a floating inductance of an electrical connecting portion between the positive electrode-side conductor PI and the positive electrode terminal 50p and an electrical connecting portion between the negative electrode-side conductor NI and the negative electrode terminal 50n can be minimized. That is, increase in a floating inductance of an electric connecting portion between the power module 21 and the capacitor unit 23 can be minimized.

In the electric power conversion device 1 of the first embodiment, as described above, the positive electrode-side conductor PI and the negative electrode-side conductor NI are electrically insulated by the electrically insulating section PNS including the protruding electrically insulating section PNS1 protruding further toward the one side in the first direction than the positive electrode-side conductor PI. In addition, the positive electrode terminal 50p and the negative electrode terminal 50n are electrically insulated by the electrically insulating section EIS including the protruding electrically insulating section EIS1 protruding further toward the other side in the first direction than the negative electrode terminal 50n.

For this reason, in the electric power conversion device 1 of the first embodiment, an electrically insulating property between the positive electrode terminal 50p and the negative electrode terminal 50n can be secured by the protruding electrically insulating section EIS1 and an electrically insulating property between the positive electrode-side conductor PI and the negative electrode-side conductor NI using the protruding electrically insulating section PNS1 can be secured while increase in a floating inductance of an electrical connecting portion between the positive electrode-side conductor PI and the positive electrode terminal 50p and an electrical connecting portion between the negative electrode-side conductor NI and the negative electrode terminal 50n is minimized.

In the electric power conversion device 1 in the first embodiment, as described above, a portion of the protrusion NIR of the negative electrode-side conductor NI protruding further toward the one side in the first direction than the protruding electrically insulating section PNS1 includes the connecting surface NIV that overlaps the connecting surface 50n1 of the negative electrode terminal 50n. In addition, a portion of the protrusion 50p2 of the positive electrode terminal 50p protruding further toward the other side in the first direction than the protruding electrically insulating section EIS1 includes the connecting surface 50p1 that overlaps the connecting surface PIV of the positive electrode-side conductor PI.

For this reason, in the electric power conversion device 1 of the first embodiment, an electrically insulating property between the positive electrode terminal 50p and the negative electrode-side conductor NI can be secured by the protruding electrically insulating section EIS1 and an electrically insulating property between the positive electrode-side conductor PI and the negative electrode terminal 50n using the protruding electrically insulating section PNS1 can be secured while increase in a floating inductance of an electrical connecting portion between the positive electrode-side conductor PI and the positive electrode terminal 50p and an electrical connecting portion between the negative electrode-side conductor NI and the negative electrode terminal 50n is minimized.

Specifically, in the example shown in FIG. 1A and FIG. 1B, a protrusion length of the positive electrode-side conductor PI, a protrusion length of the negative electrode-side conductor NI and a protrusion length of the electrically insulating section PNS from an insulating material such as a mold resin or the like (not shown) of the power module 21 have a relationship of "(a protrusion length of the negative electrode-side conductor NI)>(a protrusion length of the electrically insulating section PNS)>(a protrusion length of the positive electrode-side conductor PI)."

A protrusion length of the positive electrode terminal 50p, a protrusion length of the negative electrode terminal 50n and a protrusion length of the electrically insulating section EIS from the capacitor case 23B (see FIG. 3) of the capacitor unit 23 has a relationship of "(a protrusion length of the positive electrode terminal 50p)>(a protrusion length of the electrically insulating section EIS)>(a protrusion length of the negative electrode terminal 50n)."

In another example, a protrusion length of the positive electrode-side conductor PI, a protrusion length of the negative electrode-side conductor NI and a protrusion length of the electrically insulating section PNS from an insulating material such as a mold resin or the like of the power module 21 may have a relationship of "(a protrusion length of the negative electrode-side conductor NI)<(a protrusion length of the electrically insulating section PNS)<(a protrusion length of the positive electrode-side conductor PI)," and a protrusion length of the positive electrode terminal 50p, a protrusion length of the negative electrode terminal 50n and a protrusion length of the electrically insulating section EIS from the capacitor case 23B (see FIG. 3) of the capacitor unit 23 may have a relationship of "(a protrusion length of the positive electrode terminal 50p)<(a protrusion length of the electrically insulating section EIS)<(a protrusion length of the negative electrode terminal 50n)."

In the example shown in FIG. 1A and FIG. 1B, the protrusion length of the electrically insulating section PNS from the positive electrode-side conductor PI is a value at which the electrical insulating distance between the positive electrode-side conductor PI and the negative electrode-side conductor NI can be secured. The protrusion length of the electrically insulating section EIS from the negative electrode terminal 50n is a value at which the electrical insulating distance between the positive electrode terminal 50p and the negative electrode terminal 50n can be secured. The protrusion length of the electrically insulating section PNS from the positive electrode-side conductor PI and the protrusion length of the electrically insulating section EIS from the negative electrode terminal 50n are values at which the electrical insulating distance between the negative electrode-side conductor NI and the positive electrode terminal 50p can be secured. The protrusion length of the electrically insulating section PNS from the positive electrode-side conductor PI and the protrusion length of the electrically insulating section EIS from the negative electrode terminal 50n are values at which the electrical insulating distance between the positive electrode-side conductor PI and the negative electrode terminal 50n can be secured.

In the example shown in FIG. 2A, FIG. 2B and FIG. 3, a sum of a width between the connecting surface PIV of the positive electrode-side conductor PI and the connecting surface NIV of the negative electrode-side conductor NI of the conductor set PN of the U phase in a second direction (the leftward/upward-rightward/downward direction in FIG. 2A, FIG. 2B and FIG. 3) perpendicular to the first direction, a width between the connecting surface PIV of the positive electrode-side conductor PI and the connecting surface NIV of the negative electrode-side conductor NI of the conductor set PN of the V phase in the second direction, and a width between the connecting surface PIV of the positive electrode-side conductor PI and the connecting surface NIV of the negative electrode-side conductor NI of the conductor set PN of the W phase in the second direction is smaller than a width of the conductor set 50pn in the second direction.

For this reason, in the electric power conversion device 1 of the first embodiment, a bonding work between the conductor set PN and the conductor set 50pn can be more easily performed than the case in which the sum of the respective widths between the connecting surfaces PIV of the positive electrode-side conductors PI and the connecting surfaces NIV of the negative electrode-side conductors NI of the U phase, the V phase and the W phase in the second direction is equal to the width of the conductor set 50pn in the second direction.

Specifically, in the electric power conversion device 1 of the first embodiment, since a height of the power module 21 of the U phase (a height of the conductor set PN of the U phase), a height of the power module 21 of the V phase (a height of the conductor set PN of the V phase) and a height of the power module 21 of the W phase (a height of the conductor set PN of the W phase) can be matched with the height of the conductor set 50pn of the capacitor unit 23, the conductor set PN of the U phase, the V phase and the W phase can be fastened to the conductor set 50pn of the capacitor unit 23 using a methods such as welding or the like other than a bolt.

That is, in the electric power conversion device 1 of the first embodiment, the conductor set PN is narrower than the conductor set 50pn, an area of a bonding portion therebetween is narrower in comparison with the width of the conductor set 50pn, and they can be closely attached at the bonding portion (unlikely to generate a gap in the bonding portion). In addition, since the conductor set 50pn has a large width, an inductance reduction effect can be obtained more by a cancellation effect of a magnetic flux.

Second Embodiment

Hereinafter, a second embodiment of an electric power conversion device of the present invention will be described.

The electric power conversion device 1 of the second embodiment is configured like the electric power conversion device 1 of the above-mentioned first embodiment except for the points to be described below. Accordingly, according to the electric power conversion device 1 of the second embodiment, the same effects as those of the electric power conversion device 1 of the above-mentioned first embodiment can be exhibited except for the points to be described below.

Figure 4A:
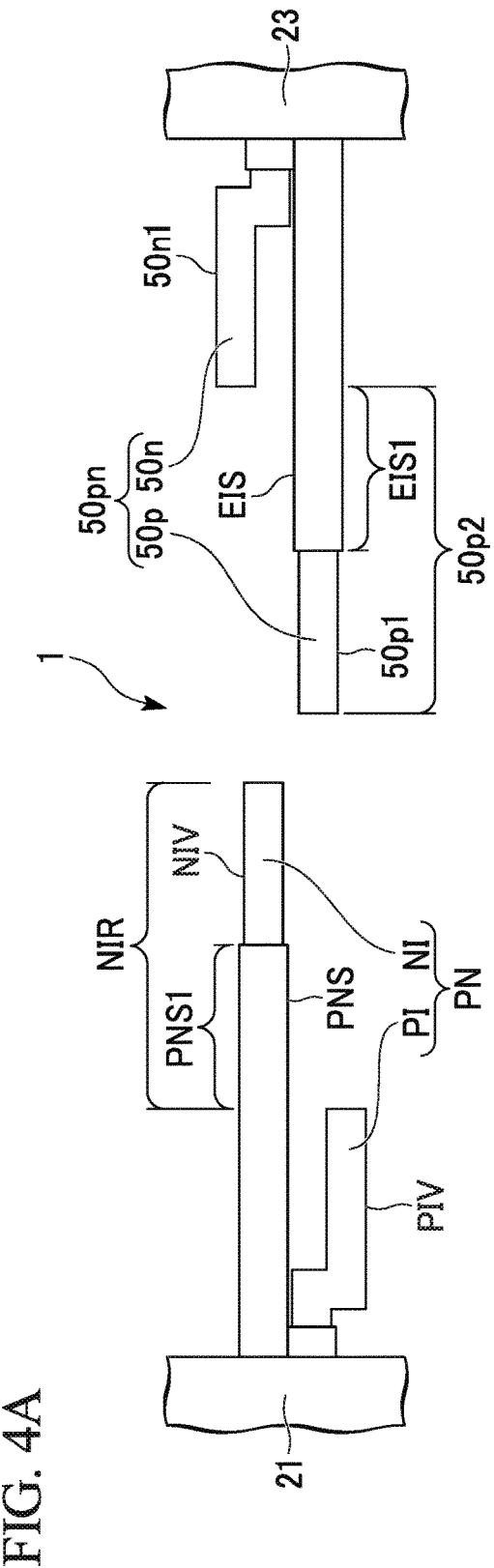
FIG. 4A is a view showing an example of a schematic configuration of an electric power conversion device of a second embodiment.
Figure 4B:
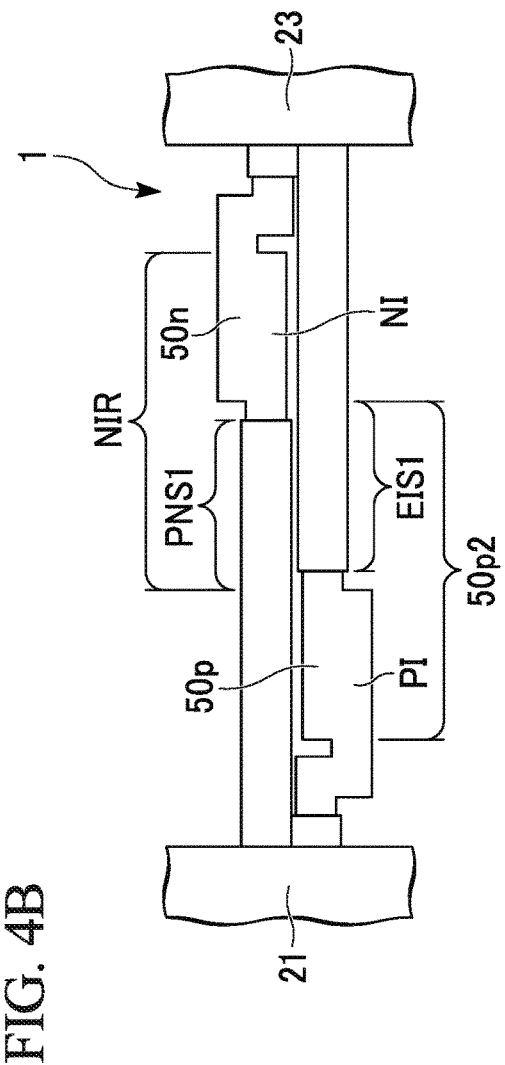
FIG. 4B is a view showing the example of the schematic configuration of the electric power conversion device of the second embodiment.

FIG. 4A and FIG. 4B are views showing an example of a schematic configuration of the electric power conversion device 1 of the second embodiment. Specifically, FIG. 4A is a schematic front view of the electric power conversion device 1 in a state before the power module (the semiconductor module) 21 is electrically connected to the capacitor unit 23. FIG. 4B is a schematic front view of the electric power conversion device 1 in a state after the power module 21 is electrically connected to the capacitor unit 23.

In the example shown in FIG. 1A and FIG. 1B, when the power module 21 is electrically connected to the capacitor unit 23, the positive electrode terminal 50p is disposed at a side opposite to the negative electrode-side conductor NI (a lower side in FIG. 1A and FIG. 1B) with a gap from the positive electrode-side conductor PI. The negative electrode-side conductor NI is disposed at a side opposite to the positive electrode terminal 50p (an upper side in FIG. 1A and FIG. 1B) with a gap from the negative electrode terminal 50n. That is, the connecting surface PIV of the positive electrode-side conductor PI is formed at a side opposite to the negative electrode-side conductor NI among the positive electrode-side conductor PI (a lower side in FIG. 1A and FIG. 1B). The connecting surface 50n1 of the negative electrode terminal 50n is formed at a side opposite to the positive electrode terminal 50p among the negative electrode terminal 50n (an upper side in FIG. 1A and FIG. 1B).

Meanwhile, in the example shown in FIG. 4A and FIG. 4B, when the power module 21 is electrically connected to the capacitor unit 23, the positive electrode terminal 50p is disposed between the positive electrode-side conductor PI and the negative electrode-side conductor NI. That is, the conductor set PN has a gap having a shape which complements a tip portion of the positive electrode terminal 50p in between the positive electrode-side conductor PI and the negative electrode-side conductor NI.

That is, in the example shown in FIG. 4A and FIG. 4B, when the power module 21 is electrically connected to the capacitor unit 23, the negative electrode-side conductor NI is disposed between the positive electrode terminal 50p and the negative electrode terminal 50n. That is, the conductor set 50pn has a gap having a shape which complements a tip portion of the negative electrode-side conductor NI in between the positive electrode terminal 50p and the negative electrode terminal 50n.

That is, in the example shown in FIG. 4A and FIG. 4B, the connecting surface PIV of the positive electrode-side conductor PI is formed at a side close to the negative electrode-side conductor NI among the positive electrode-side conductor PI (an upper side in FIG. 4A and FIG. 4B). The connecting surface 50n1 of the negative electrode terminal 50n is formed at a side close to the positive electrode terminal 50p among the negative electrode terminal 50n (a lower side in FIG. 4A and FIG. 4B).

In the electric power conversion device 1 of the second embodiment, as shown in FIG. 4A and FIG. 4B, a tip portion of the positive electrode terminal 50p is inserted in a gap provided between the positive electrode-side conductor PI and the negative electrode-side conductor NI. A tip portion of the negative electrode-side conductor NI is inserted into a gap provided between the positive electrode terminal 50p and the negative electrode terminal 50n.

For this reason, in the electric power conversion device 1 of the second embodiment, a parallel plate configuration in which a space between the positive electrode-side conductor PI, the negative electrode-side conductor NI, the positive electrode terminal 50p and the negative electrode terminal 50n has been eliminated as shown in FIG. 1B can be realized, and increase in a floating inductance of the electrical connecting portion between the power module 21 and the capacitor unit 23 can be further minimized.

Third Embodiment

Hereinafter, a third embodiment of the electric power conversion device of the present invention will be described.

The electric power conversion device 1 of the third embodiment is configured like the electric power conversion device 1 of the above-mentioned first embodiment except for the points to be described below. Accordingly, according to the electric power conversion device 1 of the third embodiment, the same effects as those of the electric power conversion device 1 of the above-mentioned first embodiment can be exhibited except for the points to be described below.

Figure 5:
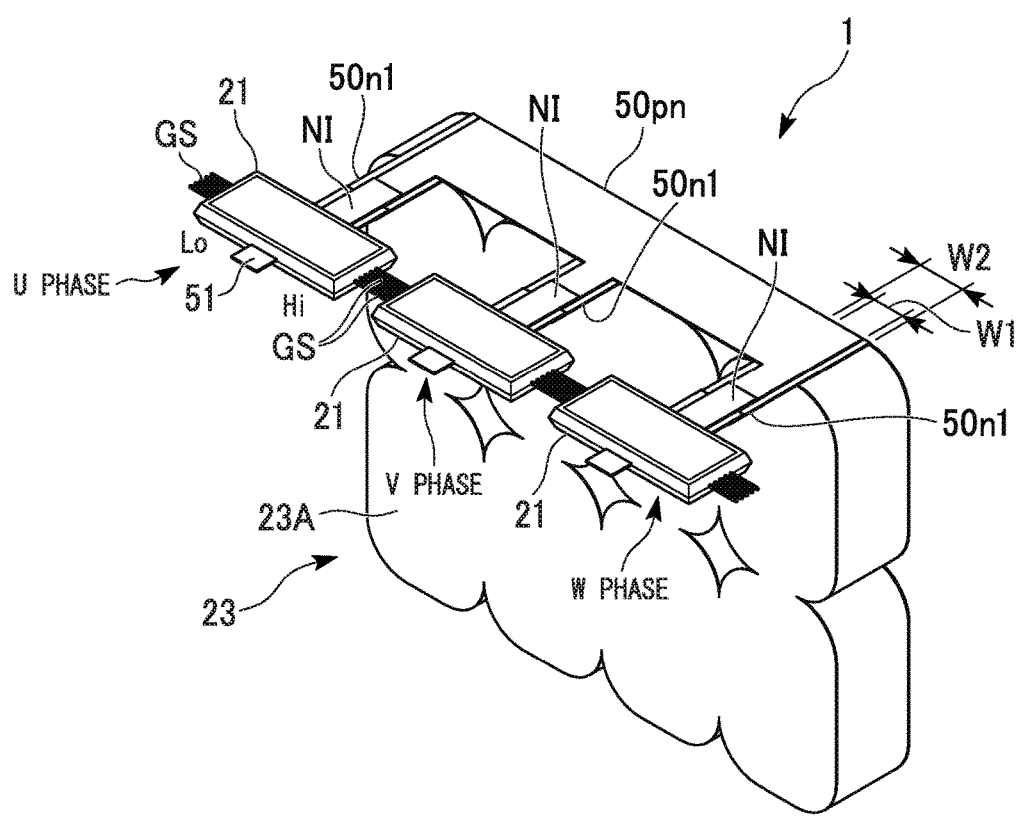
FIG. 5 is a perspective view of an example of an electric power conversion device of a third embodiment.

FIG. 5 is a perspective view of an example of the electric power conversion device 1 of the third embodiment. Specifically, FIG. 5 is a perspective view of the electric power conversion device 1 in a state after the power module 21 is electrically connected to the capacitor unit 23 when the capacitor case 23B (see FIG. 3) and a potting material are seen in a see-through view.

In the example shown in FIG. 2A, FIG. 2B and FIG. 3, as described above, the electric power conversion device 1 includes the conductor set PN of the U phase, the conductor set PN of the V phase, the conductor set PN of the W phase, and the conductor set 50pn.

A width of the connecting surface PIV (see FIG. 1A and FIG. 1B) of the positive electrode-side conductor PI and the connecting surface NIV (see FIG. 1A and FIG. 1B) of the negative electrode-side conductor NI of the conductor set PN of the U phase in the second direction (the leftward/upward-rightward/downward direction in FIG. 2A, FIG. 2B and FIG. 3) perpendicular to the first direction is substantially equal to the width of the connecting surface 50p1 of the U phase of the positive electrode terminal 50p and the connecting surface 50n1 of the U phase of the negative electrode terminal 50n of the conductor set 50pn in the second direction.

A width of the connecting surface PIV of positive electrode-side conductor PI and the connecting surface NIV of the negative electrode-side conductor NI of the conductor set PN of the V phase in the second direction is substantially equal to a width of the connecting surface 50p1 of the V phase of the positive electrode terminal 50p and the connecting surface 50n1 of the V phase of the negative electrode terminal 50n of the conductor set 50pn in the second direction.

A width of the connecting surface PIV of the positive electrode-side conductor PI and the connecting surface NIV of the negative electrode-side conductor NI of the conductor set PN of the W phase in the second direction is substantially equal to a width of the connecting surface 50p1 of the W phase of the positive electrode terminal 50p and the connecting surface 50n1 of the W phase of the negative electrode terminal 50n of the conductor set 50pn in the second direction.

In the example shown in FIG. 5, like the example shown in FIG. 2A, FIG. 2B and FIG. 3, the electric power conversion device 1 includes the conductor set PN of the U phase, the conductor set PN of the V phase, the conductor set PN of the W phase, and the conductor set 50pn.

In the example shown in FIG. 5, like the example shown in FIG. 2A, FIG. 2B and FIG. 3, a width W1 of the connecting surface PIV of the positive electrode-side conductor PI and the connecting surface NIV of the negative electrode-side conductor NI of the conductor set PN of the W phase in the second direction (the leftward/upward-rightward/downward direction in FIG. 5) perpendicular to the first direction, a width of the connecting surface PIV of the positive electrode-side conductor PI and the connecting surface NIV of the negative electrode-side conductor NI of the conductor set PN of the U phase in the second direction, and a width of the connecting surface PIV of the positive electrode-side conductor PI and the connecting surface NIV of the negative electrode-side conductor NI of the conductor set PN of the V phase in the second direction are smaller than the width of the conductor set 50pn in the second direction.

Specifically, in the example shown in FIG. 5, unlike the example shown in FIG. 2A, FIG. 2B and FIG. 3, the width W1 of the connecting surface PIV of the positive electrode-side conductor PI and the connecting surface NIV of the negative electrode-side conductor NI of the conductor set PN of the W phase in the second direction (the leftward/upward-rightward/downward direction in FIG. 5) perpendicular to the first direction is smaller than a width W2 of the connecting surface 50p1 of the W phase of the positive electrode terminal 50p and the connecting surface 50n1 of the W phase of the negative electrode terminal 50n of the conductor set 50pn in the second direction.

Similarly, the width W1 of the connecting surface PIV (see FIG. 1A and FIG. 1B) of the positive electrode-side conductor PI and the connecting surface NIV (see FIG. 1A and FIG. 1B) of the negative electrode-side conductor NI of the conductor set PN of the U phase in the second direction (the leftward/upward-rightward/downward direction in FIG. 5) is smaller than the width W2 of the connecting surface 50p1 of the U phase of the positive electrode terminal 50p and the connecting surface 50n1 of the U phase of the negative electrode terminal 50n of the conductor set 50pn in the second direction.

In addition, the width W1 of the connecting surface PIV of the positive electrode-side conductor PI and the connecting surface NI V of the negative electrode-side conductor NI of the conductor set PN of the V phase in the second direction is smaller than the width W2 of the connecting surface $50p1$ of the V phase of the positive electrode terminal $50p$ and the connecting surface $50n1$ of the V phase of the negative electrode terminal $50n$ of the conductor set $50pn$ in the second direction.

For this reason, in the electric power conversion device 1 of the third embodiment, in comparison with the case in which a sum of the respective widths W1 of the connecting surfaces PIV of the positive electrode-side conductors PI and the connecting surfaces NIV of the negative electrode-side conductors NI of the U phase, the V phase and the W phase in the second direction is equal to the width of the conductor set $50pn$ in the second direction, work of bonding the conductor set PN to the conductor set $50pn$ can be facilitated.

Specifically, in the electric power conversion device 1 of the third embodiment, since the height of the power module 21 of the U phase (the height of the conductor set PN of the U phase), the height of the power module 21 of the V phase (the height of the conductor set PN of the V phase) and the height of the power module 21 of the W phase (the height of the conductor set PN of the W phase) can be matched with the height of the conductor set $50pn$ of the capacitor unit 23, the conductor set PN of the U phase, the V phase and the W phase can be fastened to the conductor set $50pn$ of the capacitor unit 23 using a method such as welding or the like except for a bolt.

In the electric power conversion device 1 of the first and third embodiment, as shown in FIG. 2B, only places in the negative electrode terminal $50n$ corresponding to the position of the connecting surface $50p1$ of the U phase, the V phase and the W phase has a shape retracted than the positive electrode terminal $50p$ (a cutout shape). The positive electrode terminal $50p$ and the negative electrode terminal $50n$ constitute a parallel plate configuration except for the place.

For this reason, in the electric power conversion device 1 of the third embodiment, even when respective width dimensions W1 of the connecting surfaces PIV of the positive electrode-side conductors PI and the connecting surfaces NIV of the negative electrode-side conductors NI of the U phase, the V phase and the W phase are smaller than respective width dimensions W2 of the connecting surfaces $50p1$ of the U phase, the V phase and the W phase of the positive electrode terminal $50p$ and the connecting surfaces $50n1$ of the U phase, the V phase and the W phase of the negative electrode terminal $50n$, since the positive electrode terminal $50p$ and the negative electrode terminal $50n$ constitute a parallel plate configuration substantially throughout the whole region, increase in a floating inductance can be sufficiently minimized.

Specifically, in the electric power conversion device 1 of the third embodiment, the connecting surfaces $50p1$ of the U phase, the V phase and the W phase of the positive electrode terminal $50p$ to which the connecting surfaces PIV of the positive electrode-side conductors PI of the U phase, the V phase and the W phase are bonded are formed in concave shapes. In addition, the connecting surfaces $50n1$ of the U phase, the V phase and the W phase of the negative electrode terminal $50n$ to which the connecting surfaces NIV of the negative electrode-side conductors NI of the U phase, the V phase and the W phase are bonded are formed in concave shapes.

Fourth Embodiment

In the electric power conversion device 1 of the fourth embodiment, the examples of the electric power conversion device 1 of the above-mentioned first to third embodiment are appropriately combined.

Application Examples

Hereinafter, application examples of the electric power conversion device of the present invention will be described with reference to the accompanying drawings.

Figure 6:
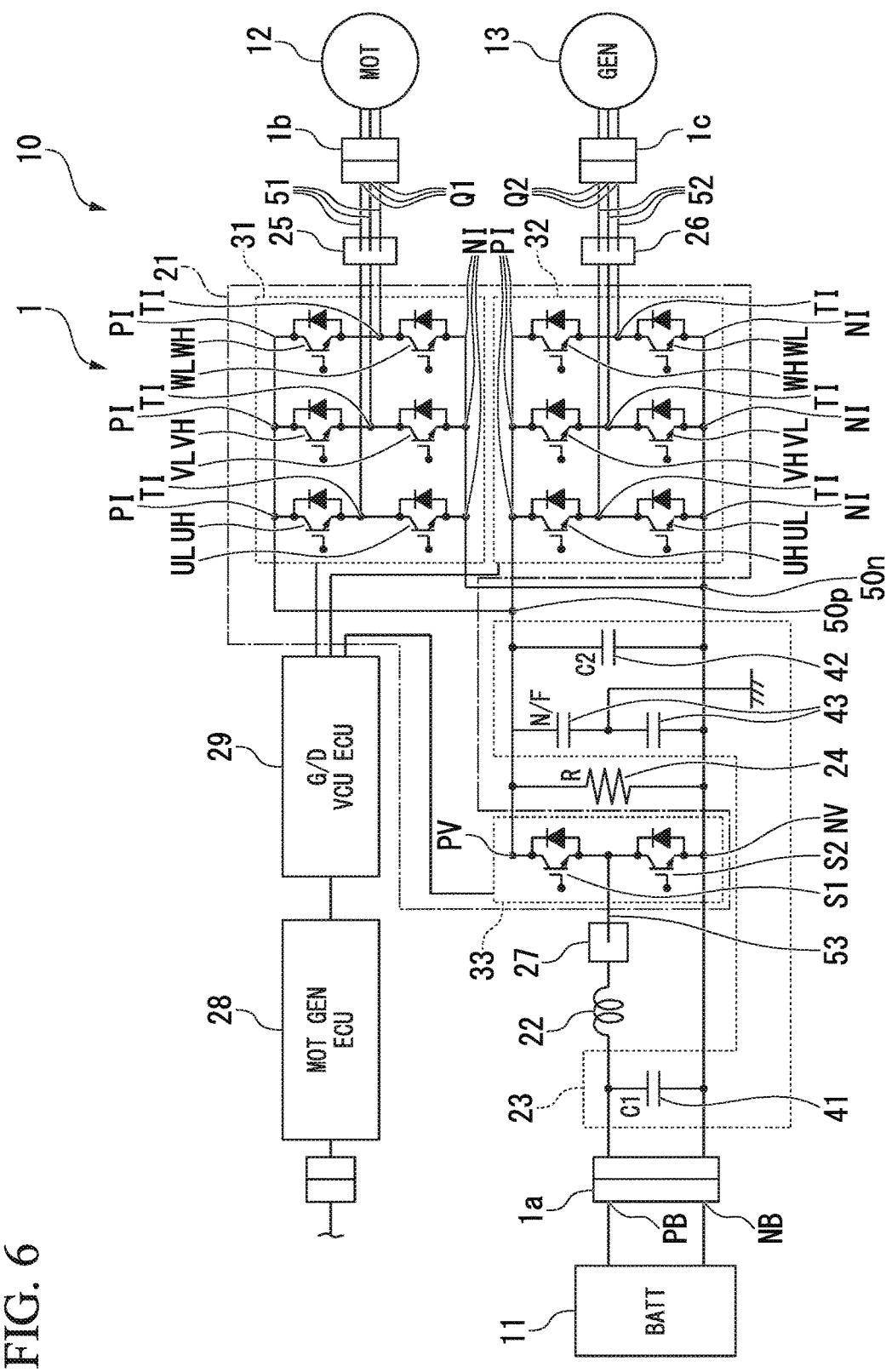
FIG. 6 is a view showing an example of a part of a vehicle to which the electric power conversion device of the first to fourth embodiments is applicable.

FIG. 6 is a view showing an example of a part of a vehicle 10, to which the electric power conversion device 1 of the first to fourth embodiments is applicable.

When the electric power conversion device 1 of the first to fourth embodiments having the U phase, the V phase and the W phase and the electric power conversion device 1 of the first to fourth embodiments of one phase are applied to the example shown in FIG. 6, two electric power conversion devices 1 of the first to fourth embodiments having the U phase, the V phase and the W phase and one electric power conversion device 1 of the first to fourth embodiments of one phase are used in the vehicle 10 shown in FIG. 6.

Specifically, the first electric power conversion device 1 of the first to fourth embodiment having the U phase, the V phase and the W phase constitutes a part of a first electric power conversion circuit section 31 and a capacitor unit 23 shown in FIG. 6. The second electric power conversion device 1 of the first to fourth embodiments having the U phase, the V phase and the W phase constitutes a part of a second electric power conversion circuit section 32 and the capacitor unit 23 shown in FIG. 6.

The one electric power conversion device 1 of the first to fourth embodiment of one phase constitutes a part of the second electric power conversion circuit section 32 and the capacitor unit 23 shown in FIG. 6.

When only the electric power conversion device 1 of the first to fourth embodiment of one phase is applied to the example shown in FIG. 6, seven electric power conversion devices 1 of the first to fourth embodiments of one phase are used in the vehicle 10 shown in FIG. 6.

Three of the seven electric power conversion devices 1 of the first to fourth embodiments of one phase constitute parts of the first electric power conversion circuit section 31 and the capacitor unit 23 shown in FIG. 6. The other three of the seven electric power conversion devices 1 of the first to fourth embodiments of one phase constitute parts of the second electric power conversion circuit section 32 and the capacitor unit 23 shown in FIG. 6. The remaining one of the seven electric power conversion devices 1 of the first to fourth embodiments of one phase constitutes a part of a third electric power conversion circuit section 33 and the capacitor unit 23 shown in FIG. 6.

In the example shown in FIG. 6, the vehicle 10 includes a battery 11 (BATT), a first motor 12 (MOT) for traveling and driving, and a second motor 13 (GEN) for generation, in addition to the electric power conversion device 1.

The battery 11 includes a battery case and a plurality of battery modules accommodated in the battery case. Each of the battery modules includes a plurality of battery cells connected in series. The battery 11 includes a positive electrode terminal PB and a negative electrode terminal NB, which are connected to a direct current connector $1a$ of the electric power conversion device 1. The positive electrode terminal PB and the negative electrode terminal NB are connected to positive electrode ends and negative electrode ends of the plurality of battery modules connected in series in the battery case.

The first motor 12 generates a rotation driving force (a power-run operation) using electric power supplied from the battery 11. The second motor 13 generates generated electric power using a rotation driving force that is input to a rotary shaft. Here, rotating power from an internal combustion engine is configured to be transmittable to the second motor 13. For example, each of the first motor 12 and the second motor 13 is a 3-phase alternating current brushless DC motor. Three phases are a U phase, a V phase and a W phase. Each of the first motor 12 and the second motor 13 is an inner rotor type. Each of the first motor 12 and the second motor 13 includes a rotator having a permanent magnet for a field system, and a stator having a 3-phase stator winding configured to generate a rotating magnetic field that rotates the rotator. The 3-phase stator winding of the first motor 12 is connected to a first 3-phase connector 1b of the electric power conversion device 1. The 3-phase stator winding of the second motor 13 is connected to a second 3-phase connector 1c of the electric power conversion device 1.

The electric power conversion device 1 shown in FIG. 6 includes the power module 21, a reactor 22, the capacitor unit 23, a resistor 24, a first current sensor 25, a second current sensor 26, a third current sensor 27, an electronic control unit 28 (MOT GEN ECU) and a gate drive unit 29 (G/D VCU ECU).

The power module 21 includes a first electric power conversion circuit section 31, a second electric power conversion circuit section 32 and a third electric power conversion circuit section 33.

Output-side conductors (output bus bars) 51 of the first electric power conversion circuit section 31 are bundled to a 3-phase extent of a U phase, a V phase and a W phase and connected to the first 3-phase connector 1b. That is, the output-side conductors 51 of the first electric power conversion circuit section 31 are connected to the 3-phase stator winding of the first motor 12 via the first 3-phase connector 1b.

Positive electrode-side conductors (P bus bars) PI of the first electric power conversion circuit section 31 are bundles to a 3-phase extent of a U phase, a V phase and a W phase and connected to the positive electrode terminal PB of the battery 11.

Negative electrode-side conductors (N bus bars) NI of the first electric power conversion circuit section 31 are bundled to a 3-phase extent of a U phase, a V phase and a W phase and connected to the negative electrode terminal NB of the battery 11.

That is, the first electric power conversion circuit section 31 converts direct current electric power input from the battery 11 via the third electric power conversion circuit section 33 into 3-phase alternating current electric power.

Output-side conductors (output bus bars) 52 of the second electric power conversion circuit section 32 are bundled to a 3-phase extent of a U phase, a V phase and a W phase and connected to the second 3-phase connector 1c. That is, the output-side conductors 52 of the second electric power conversion circuit section 32 are connected to the 3-phase stator winding of the second motor 13 via the second 3-phase connector 1c.

The positive electrode-side conductors (the P bus bars) PI of the second electric power conversion circuit section 32 are bundled to a 3-phase extent of a U phase, a V phase and a W phase and connected to the positive electrode terminal PB of the battery 11 and the positive electrode-side conductor PI of the first electric power conversion circuit section 31.

The negative electrode-side conductors (the N bus bars) NI of the second electric power conversion circuit section 32 are bundled to a 3-phase extent of a U phase, a V phase and a W phase and connected to the negative electrode terminal NB of the battery 11 and the negative electrode-side conductor NI of the first electric power conversion circuit section 31.

The second electric power conversion circuit section 32 converts 3-phase alternating current electric power input from the second motor 13 into direct current electric power. The direct current electric power converted by the second electric power conversion circuit section 32 can be supplied to at least one of the battery 11 and the first electric power conversion circuit section 31.

In the example shown in FIG. 6, the upper arm element UH of the U phase, the upper arm element VH of the V phase and the upper arm element WH of the W phase of the first electric power conversion circuit section 31, and the upper arm element UH of the U phase, the upper arm element VH of the V phase and the upper arm element WH of the W phase of the second electric power conversion circuit section 32 are connected to the positive electrode-side conductor PI. The positive electrode-side conductor PI is connected to the positive electrode terminal (the positive electrode bus bar) 50p of the capacitor unit 23.

The lower arm element UL of the U phase, the lower arm element VL of the V phase and the lower arm element WL of the W phase of the first electric power conversion circuit section 31, and the lower arm element UL of the U phase, the lower arm element VL of the V phase and the lower arm element WL of the W phase of the second electric power conversion circuit section 32 are connected to the negative electrode-side conductor NI. The negative electrode-side conductor NI is connected to the negative electrode terminal (the negative electrode bus bar) 50n of the capacitor unit 23.

In the example shown in FIG. 6, a connecting point TI between the upper arm element UH and the lower arm element UL of the U phase, a connecting point TI between the upper arm element VH and the lower arm element VL of the V phase and a connecting point TI between the upper arm element WH and the lower arm element WL of the W phase of the first electric power conversion circuit section 31 are connected to the output-side conductor 51.

A connecting point TI between the upper arm element UH and the lower arm element UL of the U phase, a connecting point TI between the upper arm element VH and the lower arm element VL of the V phase and a connecting point TI between the upper arm element WH and the lower arm element WL of the W phase of the second electric power conversion circuit section 32 are connected to the output-side conductors 52.

In the example shown in FIG. 6, the output-side conductor 51 of the first electric power conversion circuit section 31 is connected to a first input/output terminal Q1. The first input/output terminal Q1 is connected to the first 3-phase connector 1b. The connecting point TI of each phase of the first electric power conversion circuit section 31 is connected to the stator winding of each phase of the first motor 12 via the output-side conductor 51, the first input/output terminal Q1 and the first 3-phase connector 1b.

The output-side conductors 52 of the second electric power conversion circuit section 32 are connected to a second input/output terminal Q2. The second input/output terminal Q2 is connected to the second 3-phase connector 1c. The connecting point TI of each phase of the second electric power conversion circuit section 32 is connected to the stator winding of each phase of the second motor 13 via the output-side conductors 52, the second input/output terminal Q2 and the second 3-phase connector 1c.

In the example shown in FIG. 6, each of the upper arm elements UH, VH and WH and the lower arm elements UL, VL and WL of the first electric power conversion circuit section 31 includes a flywheel diode.

Similarly, each of the upper arm elements UH, VH and WH and the lower arm elements UL, VL and WL of the second electric power conversion circuit section 32 includes a flywheel diode.

In the example shown in FIG. 6, the gate drive unit 29 inputs a gate signal to each of the upper arm elements UH, VH and WH and the lower arm elements UL, VL and WL of the first electric power conversion circuit section 31.

Similarly, the gate drive unit 29 inputs a gate signal to each of the upper arm elements UH, VH and WH and the lower arm elements UL, VL and WL of the second electric power conversion circuit section 32.

The first electric power conversion circuit section 31 converts direct current electric power input from the battery 11 via the third electric power conversion circuit section 33 into 3-phase alternating current electric power, and supplies U phase current, V phase current and W phase current, which are alternating current, to the 3-phase stator winding of the first motor 12. The second electric power conversion circuit section 32 converts 3-phase alternating current electric power output from the 3-phase stator winding of the second motor 13 into direct current electric power through ON (connection)/OFF (disconnection) driving of the upper arm elements UH, VH and WH and the lower arm elements UL, VL and WL of the second electric power conversion circuit section 32 synchronized with rotation of the second motor 13.

The third electric power conversion circuit section 33 is a voltage control unit (VCU). The third electric power conversion circuit section 33 includes an upper arm element S1 and a lower arm element S2 of one phase.

An electrode of the upper arm element S1 on a positive electrode side is connected to a positive electrode bus bar PV. The positive electrode bus bar PV is connected to a positive electrode terminal (a positive electrode bus bar) 50p of the capacitor unit 23. An electrode of the lower arm element S2 on a negative electrode side is connected to a negative electrode bus bar NV. The negative electrode bus bar NV is connected to a negative electrode terminal (a negative electrode bus bar) 50n of the capacitor unit 23. The negative electrode terminal 50n of the capacitor unit 23 is connected to the negative electrode terminal NB of the battery 11. The electrode of the upper arm element S1 on the negative electrode side is connected to the electrode of the lower arm element S2 on the positive electrode side. The upper arm element S1 and the lower arm element S2 include a flywheel diode.

A bus bar 53 that constitutes the connecting point between the upper arm element S1 and the lower arm element S2 of the third electric power conversion circuit section 33 is connected to one end of the reactor 22. The other end of the reactor 22 is connected to the positive electrode terminal PB of the battery 11. The reactor 22 includes a coil, and a temperature sensor configured to detect a temperature of the coil. The temperature sensor is connected to the electronic control unit 28 by a signal line.

The third electric power conversion circuit section 33 switches ON (connection)/OFF (disconnection) between the upper arm element S1 and the lower arm element S2 based on the gate signal input to the gate electrode of the upper arm element S1 and the gate electrode of the lower arm element S2 from the gate drive unit 29.

The third electric power conversion circuit section 33 alternately switches between a first state in which the lower arm element S2 is set to ON (connection) and the upper arm element S1 is set to OFF (disconnection) and a second state in which the lower arm element S2 is set to OFF (disconnection) and the upper arm element S1 is set to ON (connection) during boosting. In the first state, current flows to the positive electrode terminal PB of the battery 11, the reactor 22, the lower arm element S2, and the negative electrode terminal NB of the battery 11 in sequence, and the reactor 22 is magnetically excited by direct current and magnetic energy is accumulated. In the second state, an actuating voltage (an induction voltage) is generated between both ends of the reactor 22 such that a variation in magnetic flux due to cutting of the current flowing through the reactor 22 is disturbed. The induction voltage due to the magnetic energy accumulated in the reactor 22 is superimposed on a battery voltage, and the boosted voltage higher than an inter-terminal voltage of the battery 11 is applied between the positive electrode bus bar PV and the negative electrode bus bar NV of the third electric power conversion circuit section 33.

The third electric power conversion circuit section 33 alternately switches between the second state and the first state during regeneration. In the second state, current flows to the positive electrode bus bar PV of the third electric power conversion circuit section 33, the upper arm element S1, the reactor 22, and the positive electrode terminal PB of the battery 11 in sequence, and the reactor 22 is magnetically excited by direct current and magnetic energy is accumulated. In the first state, an actuating voltage (an induction voltage) is generated between both ends of the reactor 22 such that a variation in magnetic flux due to cutting of the current flowing through the reactor 22 is disturbed. The induction voltage by the magnetic energy accumulated in the reactor 22 is dropped, and the dropped voltage lower than the voltage between the positive electrode bus bar PV and the negative electrode bus bar NV of the third electric power conversion circuit section 33 is applied between the positive electrode terminal PB and the negative electrode terminal NB of the battery 11.

The capacitor unit 23 includes a first smoothing capacitor 41, a second smoothing capacitor 42 and a noise filter 43.

The first smoothing capacitor 41 is connected between the positive electrode terminal PB and the negative electrode terminal NB of the battery 11. The first smoothing capacitor 41 smoothes voltage fluctuation generated according to a switching operation of ON/OFF of the upper arm element S1 and the lower arm element S2 during regeneration of the third electric power conversion circuit section 33.

The second smoothing capacitor 42 is connected between the positive electrode-side conductor PI and the negative electrode-side conductor NI of each of the first electric power conversion circuit section 31 and the second electric power conversion circuit section 32, and between the positive electrode bus bar PV and the negative electrode bus bar NV of the third electric power conversion circuit section 33. The second smoothing capacitor 42 is connected to the plurality of positive electrode-side conductors PI and the plurality of negative electrode-side conductors NI, and the positive electrode bus bar PV and the negative electrode bus bar NV, via the positive electrode terminal (the positive electrode bus bar) 50p and the negative electrode terminal (the negative electrode bus bar) 50n. The second smoothing capacitor 42 smoothes voltage fluctuation generated according to a switching operation of ON/OFF of each of the upper arm elements UH, VH and WH and the lower arm elements UL, VL and WL of the first electric power conversion circuit section 31 and the second electric power conversion circuit section 32. The second smoothing capacitor 42 smoothes voltage fluctuation generated according to a switching operation of ON/OFF of the upper arm element S1 and the lower arm element S2 during boosting of the third electric power conversion circuit section 33.

The noise filter 43 is connected between the positive electrode-side conductor PI and the negative electrode-side conductor of each of the first electric power conversion circuit section 31 and the second electric power conversion circuit section 32, and between the positive electrode bus bar PV and the negative electrode bus bar NV of the third electric power conversion circuit section 33. The noise filter 43 includes two capacitors connected in series. A connecting point between the two capacitors is connected to a body ground or the like of the vehicle 10.

The resistor 24 is connected between the positive electrode-side conductor PI and the negative electrode-side conductor NI of each of the first electric power conversion circuit section 31 and the second electric power conversion circuit section 32, and between the positive electrode bus bar PV and the negative electrode bus bar NV of the third electric power conversion circuit section 33.

The first current sensor 25 forms the connecting point TI of each phase of the first electric power conversion circuit section 31, is disposed on the output-side conductor 51 connected to the first input/output terminal Q1, and detects current of each of the U phase, the V phase and the W phase. The second current sensor 26 is disposed on the output-side conductors 52 connected to the second input/output terminal Q2 while forming the connecting point TI of each phase of the second electric power conversion circuit section 32, and detects current of each of the U phase, the V phase and the W phase. The third current sensor 27 is disposed on the bus bar 53 connected to the reactor 22 while forming a connecting point between the upper arm element S1 and the lower arm element S2, and detects current flowing to the reactor 22.

Each of the first current sensor 25, the second current sensor 26 and the third current sensor 27 is connected to the electronic control unit 28 by a signal line.

The electronic control unit 28 controls an operation of each of the first motor 12 and the second motor 13. For example, the electronic control unit 28 is a software function part that serves as a predetermined program is executed by a processor such as a central processing unit (CPU) or the like. The software function part is an electronic control unit (ECU) including a processor such as a CPU or the like, a read only memory (ROM) on which a program is stored, a random access memory (RAM) on which data are temporarily stored, and an electronic circuit such as a timer or the like. Further, at least a part of the electronic control unit 28 may be an integrated circuit such as large scale integration (LSI) or the like. For example, the electronic control unit 28 executes feedback control or the like of current using a current detection value of the first current sensor 25 and a current target value according to a torque command value with respect to the first motor 12, and generates a control signal input to the gate drive unit 29. For example, the electronic control unit 28 executes feedback control or the like of current using a current detection value of the second current sensor 26 and a current target value according to a regeneration command value with respect to the second motor 13, and generates a control signal input to the gate drive unit 29. The control signal is a signal indicating a timing when each of the upper arm elements UH, VH and WH and the lower arm elements UL, VL and WL of the first electric power conversion circuit section 31 and the second electric power conversion circuit section 32 is driven to turn ON (connection)/OFF (disconnection). For example, the control signal is a pulse-width-modulated signal or the like.

The gate drive unit 29 generates a gate signal for actually driving ON (connection)/OFF (disconnection) of each of the upper arm elements UH, VH and WH and the lower arm elements UL, VL and WL of the first electric power conversion circuit section 31 and the second electric power conversion circuit section 32 on the basis of a control signal received from the electronic control unit 28. For example, the gate drive unit 29 executes amplification, a level shift, and so on, of the control signal, and generates a gate signal.

The gate drive unit 29 generates a gate signal for driving ON (connection)/OFF (disconnection) of each of the upper arm element S1 and the lower arm element S2 of the third electric power conversion circuit section 33. For example, the gate drive unit 29 generates a gate signal of a duty ratio according to a boosted voltage command during boosting of the third electric power conversion circuit section 33 or a dropped voltage command during regeneration of the third electric power conversion circuit section 33. A duty ratio is a ratio between the upper arm element S1 and the lower arm element S2.

In the example show in FIG. 6, while the electric power conversion device 1 of the first to fourth embodiments is applied to the vehicle 10, in another example, the electric power conversion device 1 of the first to fourth embodiments may be applied to a machine other than the vehicle 10, for example, an elevator, a pump, a fan, a railway vehicle, an air conditioner, a refrigerator, a washing machine, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An electric power conversion device comprising:
   a semiconductor element section having an upper arm element and a lower arm element;
   a capacitor;
   an element-side first electrode conductor electrically connected to one of the upper arm element and the lower arm element and extending toward one side in a first direction;
   an element-side second electrode conductor electrically connected to the other one of the upper arm element and the lower arm element and extending toward the one side in the first direction;
   a capacitor-side first electrode conductor electrically connected to the capacitor and extending toward other side in the first direction; and
   a capacitor-side second electrode conductor electrically connected to the capacitor and extending toward the other side in the first direction, wherein the element-side first electrode conductor and the element-side second electrode conductor face each other and constitute an element-side conductor set, the capacitor-side first electrode conductor and the capacitor-side second electrode conductor face each other and constitute a capacitor-side conductor set, the element-side first electrode conductor comprises an element-side first connecting surface that overlaps with the capacitor-side first electrode conductor, the element-side second electrode conductor comprises an element-side protrusion protruding further toward the one side in the first direction than the element-side first electrode conductor, the element-side protrusion comprises an element-side second connecting surface that overlaps with the capacitor-side second electrode conductor, the capacitor-side first electrode conductor comprises a capacitor-side protrusion protruding further toward the other side in the first direction than the capacitor-side second electrode conductor, the capacitor-side protrusion comprises a capacitor-side first connecting surface that overlaps with the element-side first connecting surface, the capacitor-side second electrode conductor comprises a capacitor-side second connecting surface that overlaps with the element-side second connecting surface, the element-side first connecting surface and the capacitor-side first connecting surface extend parallel to each other and are electrically connected to each other since the element-side first connecting surface and the capacitor-side first connecting surface overlap with each other, and the element-side second connecting surface and the capacitor-side second connecting surface extend parallel to each other and are electrically connected to each other since the element-side second connecting surface and the capacitor-side second connecting surface overlap with each other.

2. The electric power conversion device according to claim 1, wherein a plurality of element-side conductor sets are provided, and a width of the element-side first connecting surface and the element-side second connecting surface of each of the element-side conductor sets in a second direction perpendicular to the first direction is smaller than a width of the capacitor-side conductor set in the second direction.

3. The electric power conversion device according to claim 1, comprising:

an element-side electrically insulating section configured to electrically insulate the element-side first electrode conductor from the element-side second electrode conductor; and a capacitor-side electrically insulating section configured to electrically insulate the capacitor-side first electrode conductor from the capacitor-side second electrode conductor, wherein the element-side electrically insulating section comprises an element-side protruding electrically insulating section protruding further toward the one side in the first direction than the element-side first electrode conductor, and the capacitor-side electrically insulating section comprises a capacitor-side protruding electrically insulating section protruding further toward the other side in the first direction than the capacitor-side second electrode conductor.

4. The electric power conversion device according to claim 3, wherein the element-side second electrode conductor protrudes toward the one side in the first direction further than the element-side protruding electrically insulating section, a portion of the element-side protrusion protruding further toward the one side in the first direction than the element-side protruding electrically insulating section comprises the element-side second connecting surface, the capacitor-side first electrode conductor protrudes toward the other side in the first direction further than the capacitor-side protruding electrically insulating section, and a portion of the capacitor-side protrusion protruding further toward the other side in the first direction than the capacitor-side protruding electrically insulating section comprises the capacitor-side first connecting surface.

* * * * *